(12) United States Patent
     Scherrer

(10) Patent No.:  US 9,176,260 B2
(45) Date of Patent:  Nov. 3, 2015

(54) LED LENS ASSEMBLY

(71) Applicant: Paul A. Scherrer, Hebron, KY (US)

(72) Inventor: Paul A. Scherrer, Hebron, KY (US)

(73) Assignee: SUR-SEAL CORPORATION, Cincinnati, OH (US)

( * ) Notice: Subject to any disclaimer, the term of this patent is extended or adjusted under 35 U.S.C. 154(b) by 288 days.

(21) Appl. No.: 13/776,881

(22) Filed: Feb. 26, 2013

(65) Prior Publication Data

US 2014/0240844 A1    Aug. 28, 2014

(51) Int. Cl.

| | |
|---|---|
| *G02B 7/00* | (2006.01) |
| *G02B 3/00* | (2006.01) |
| *B29D 11/00* | (2006.01) |
| *B29C 45/16* | (2006.01) |
| *G02B 19/00* | (2006.01) |
| *B29L 11/00* | (2006.01) |

(52) U.S. Cl.
     CPC . *G02B 3/00* (2013.01); *B29C 45/16* (2013.01); *B29C 45/1615* (2013.01); *B29D 11/00278* (2013.01); *G02B 19/0014* (2013.01); *G02B 19/0066* (2013.01); *B29L 2011/0075* (2013.01)

(58) Field of Classification Search
     CPC .................................. G02B 3/00; B29C 45/16
     See application file for complete search history.

(56) References Cited

U.S. PATENT DOCUMENTS

| | | | |
|---|---|---|---|
| 6,379,139 B1 | 4/2002 | Boucherie | |
| 6,682,675 B1 | 1/2004 | Vandangeot et al. | |
| 6,776,597 B2 | 8/2004 | Buhler | |
| 7,325,955 B2 | 2/2008 | Lucas et al. | |
| 7,521,782 B2 | 4/2009 | Ishii | |
| 8,294,975 B2 | 10/2012 | Varaprasad et al. | |
| 2002/0012250 A1 | 1/2002 | Nestell et al. | |
| 2003/0197958 A1 | 10/2003 | Wulff et al. | |
| 2004/0010876 A1 | 1/2004 | Kraemer | |

(Continued)

FOREIGN PATENT DOCUMENTS

| | | |
|---|---|---|
| EP | 0 911 273 A1 | 4/1999 |
| EP | 1 793 245 A2 | 6/2007 |

OTHER PUBLICATIONS

Plastic Moulding Processes—Double Shot Injection Moulding, or Co-Moulding; Double Shot Injection Moulding/Co Moulding/Tail Light Lense Moulding; http://www.manufacturelink.com.au/processes/plastic-moulding-co-moulding.aspx; Copyright © 2012 Australian Manufacturing Technology Institute Limited; printed Oct. 24, 2012; p. 3-4.

(Continued)

*Primary Examiner* — Joseph P Martinez
(74) *Attorney, Agent, or Firm* — Hasse & Nesbitt LLC; Daniel F. Nesbitt

(57) ABSTRACT

A method of manufacturing a co-molded lens assembly comprising injecting a first material in a complete bezel mold having a bezel injection half and a bezel ejection half to form a bezel, and then injecting a second material in a complete optics mold to form a lens that is co-molded to the bezel. A third material is injected in a complete gasket mold to co-mold a gasket to the bezel.

12 Claims, 9 Drawing Sheets

(56) References Cited

U.S. PATENT DOCUMENTS

| | | |
|---|---|---|
| 2004/0184278 A1 | 9/2004 | Cheron et al. |
| 2007/0159008 A1 | 7/2007 | Bayat et al. |
| 2008/0089060 A1 | 4/2008 | Kondo et al. |
| 2008/0232124 A1 | 9/2008 | Tsukamoto et al. |
| 2010/0116387 A1 | 5/2010 | Channey et al. |
| 2011/0170298 A1 | 7/2011 | Anaokar et al. |
| 2011/0215341 A1 | 9/2011 | Bond et al. |
| 2012/0126267 A1 | 5/2012 | Jung et al. |
| 2014/0268762 A1* | 9/2014 | Raleigh et al. ............... 362/244 |

OTHER PUBLICATIONS

Ruyf, Carol; Using DFM to Reduce the Cost of Co-molding Bezels; Esterline Informer April—CoMold Article; http://www.esterline.com/advancedinput/News/CompanyNewsletter/InformerAprilCoMol . . . ; Copyright © 2012 Esterline Technologies Corporation; printed Dec. 3, 2012; p. 1-4.

International Search Report and Written Opinion of the International Search Authority, International application PCT/US2014/018145, mailed Mar. 31, 2015, 7 pages.

\* cited by examiner

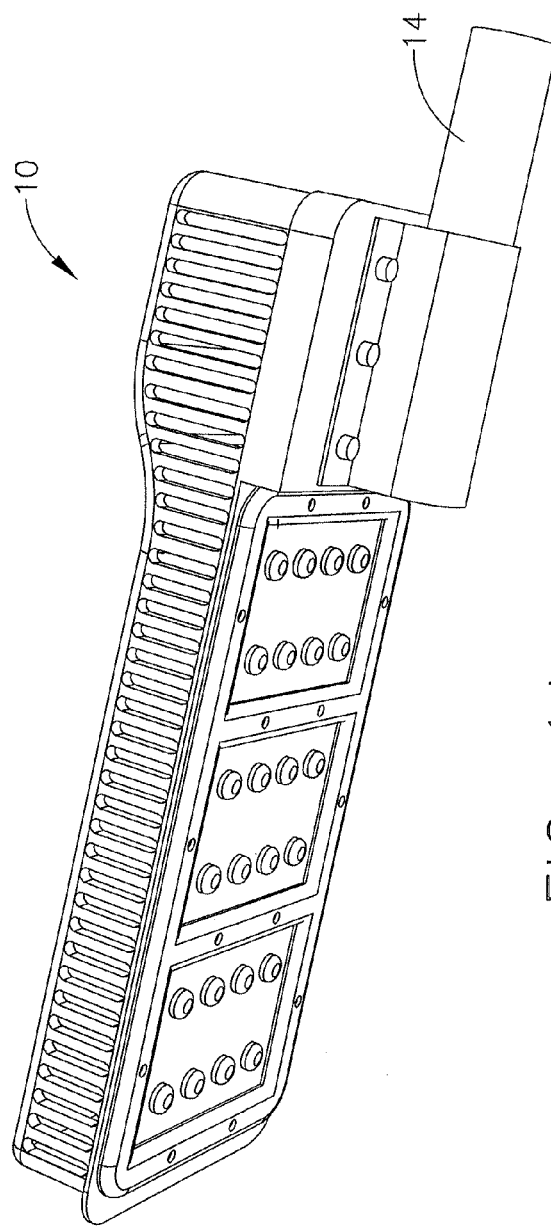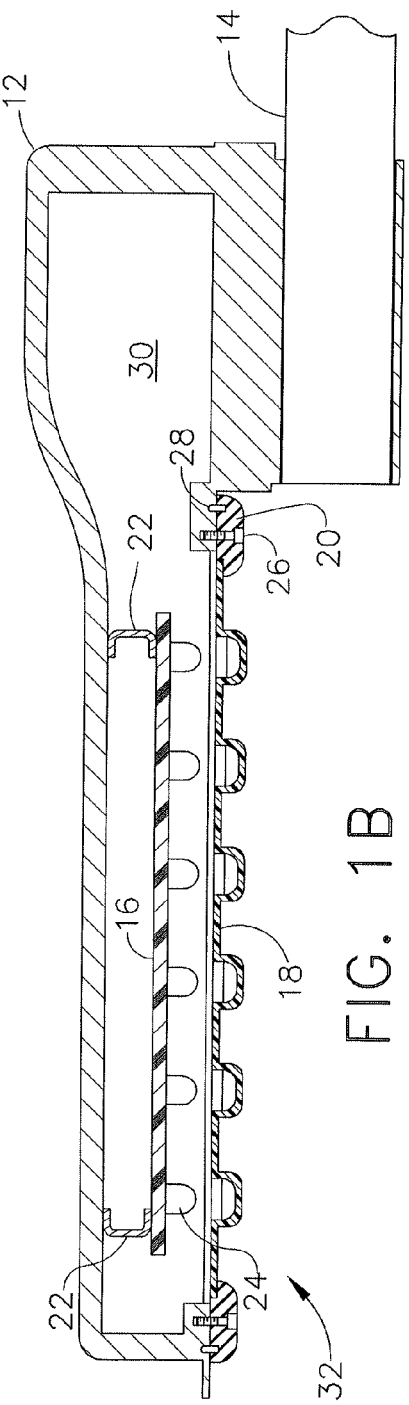
FIG. 1A
FIG. 1B

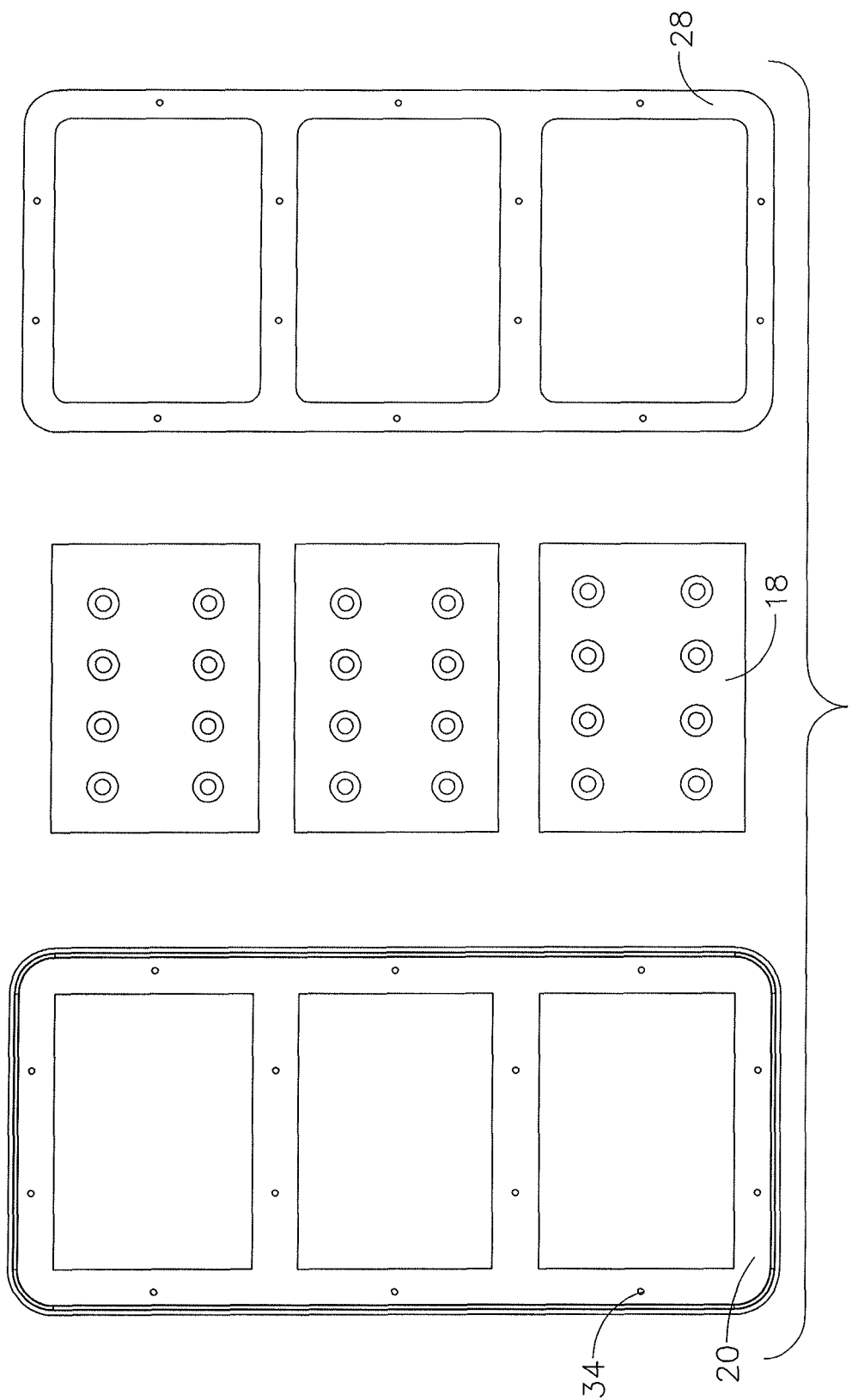

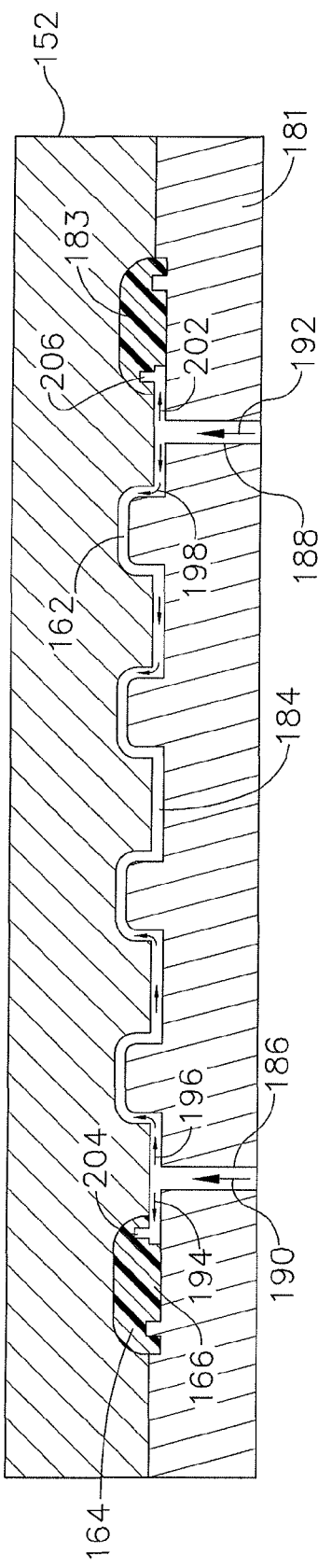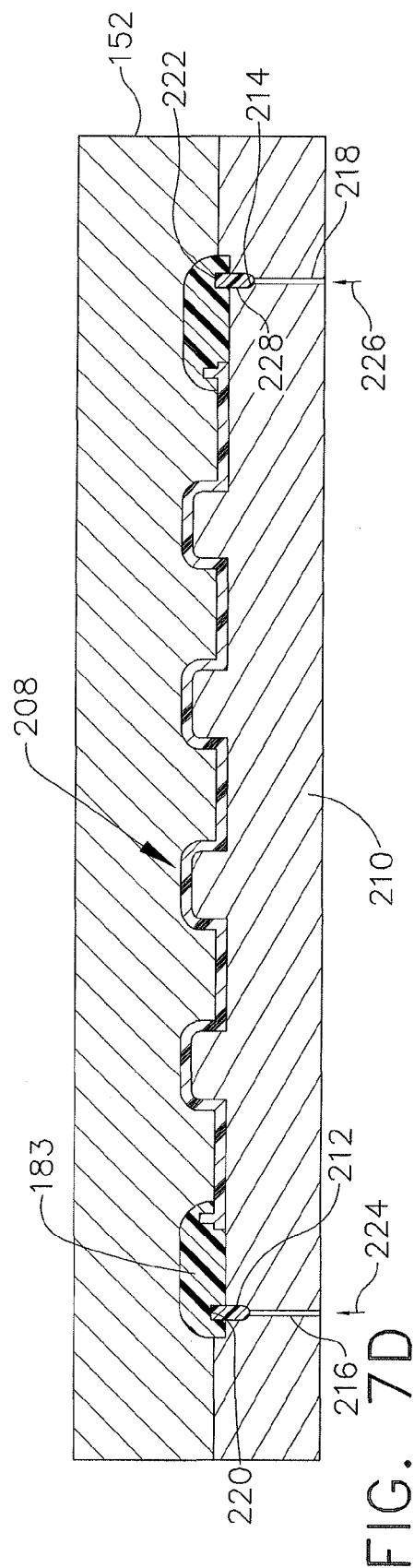
FIG. 7C
FIG. 7D

LED LENS ASSEMBLY

FIELD OF INVENTION

This invention relates generally to a method of manufacturing a lens assembly using a co-molding or over-molding process, and more particularly to a method of manufacturing a LED lens assembly by co-molding or over-molding the lens, bezel, and gasket of the LED lens assembly.

BACKGROUND OF THE INVENTION

Light Emitting Diodes (LED) light fixtures are becoming commonplace as utilities, governments, businesses, and individuals seek methods of decreasing energy costs. LED lights have the advantage of decreased energy usage when compared to traditional light sources such as incandescent, metal halide, and high pressure sodium. Additionally, with projected lives of 100,000 hours or more, they provide the ideal replacement where maintenance costs are high, such as street lighting.

Typically, an LED fixture comprises a housing, an LED light source, a lens, a bezel for securing the lens to the housing, and a gasket for creating a seal between the housing and the bezel. Creating a sealed fixture is particularly important when the fixture will be exposed to harsh environments, such as weather when the fixture is used for outdoor or street lighting. Traditionally, the lens, gasket, and bezel are separate components and must be preassembled before securing to the fixture. A one piece lens, gasket, and bezel would reduce assembly cost by eliminating the preassembly step.

Plastic or polymer components, including the lens and gasket, and sometimes the bezel, are typically injection molded. In the injection molding process, material is fed into a heated barrel, mixed, and forced into a mold cavity where it cools and hardens to the configuration of the cavity. Molds can be of a single cavity or multiple cavities. In multiple cavity molds, each cavity can be identical and form the same parts or can be unique and form multiple different parts during a single cycle. Molds are generally made from tool steel, but stainless steels and aluminum molds are suitable for certain applications.

A parting line, sprue, gate marks, and ejector pin marks are usually present on the final part. None of these features are typically desired, but are unavoidable due to the nature of the process. Gate marks occurs at the gate which joins the melt-delivery channels (sprue and runner) to the part forming cavity. Parting line and ejector pin marks result from minute misalignments, wear, gaseous vents, clearances for adjacent parts in relative motion, and/or dimensional differences of the mating surfaces contacting the injected polymer. Dimensional differences can be attributed to non-uniform, pressure-induced deformation during injection, machining tolerances, and non-uniform thermal expansion and contraction of mold components, which experience rapid cycling during the injection, packing, cooling, and ejection phases of the process. Mold components are often designed with materials of various coefficients of thermal expansion.

The mold consists of two primary components, the injection mold and the ejection mold. Plastic resin enters the mold through a sprue in the injection mold and a sprue bushing on the mold tightly seals against the nozzle of the injection barrel of the molding machine to allow molten plastic to flow from the barrel into the mold. The sprue bushing directs the molten plastic to the cavity images through channels that are machined into the faces of the injection and ejection molds. These channels allow plastic to run along them, so they are referred to as runners. The molten plastic flows through the runner, enters one or more gates, and flows into the cavity to form the desired part.

The amount of resin required to fill the sprue, runner and cavities of a mold is a shot. Trapped air in the mold can escape through air vents that are ground into the parting line of the mold. If the trapped air is not allowed to escape, it is compressed by the pressure of the incoming material and is squeezed into the corners of the cavity, where it prevents filling and causes other defects as well.

Sides of the part that appear parallel with the direction of draw are typically angled slightly (referred to as draft) to ease release of the part from the mold. The draft required for mold release is primarily dependent on the depth of the cavity: the deeper the cavity, the more draft necessary. Shrinkage must also be taken into account when determining the draft required. If the skin is too thin, then the molded part will tend to shrink onto the cores that form them while cooling and cling to those cores. Then the part may warp, twist, blister or crack when the cavity is pulled away. The mold is usually designed so that the molded part reliably remains on the ejection mold of the mold when it opens, and draws the runner and the sprue out of the injection mold along with the part. The part then falls freely when ejected from the ejection mold. Ejector pins, also known as knockout pins, are circular pins placed in either half of the mold (usually the ejection half), which push the finished molded product of a mold after it has cooled sufficiently.

The standard method of cooling is passing a coolant (usually water) through a series of holes drilled through the mold plates and connected by hoses to form a continuous pathway. The coolant absorbs heat from the mold (which has absorbed heat from the hot plastic) and keeps the mold at a proper temperature to solidify the plastic at the most efficient rate.

Over-molding refers to inserting previously molded parts into an injection molding machine to inject a new plastic or polymeric layer around the first part. Co-molding refers to molding multiple components of the same assembly in the injection molding machine, typically at the same time, either with the same mold or with multiple molds.

Two-shot or multi-shot molds are designed to co-mold within a single molding cycle and must be processed on specialized injection molding machines with two or more injection units. This process is actually an injection molding process performed twice. In the first step, the first material molded into a basic shape, which contains spaces for the second shot. Then the second material is injection-molded into those spaces and adheres to the first material.

SUMMARY OF THE INVENTION

The invention relates to a method of manufacturing a co-molded lens assembly comprising injecting a first material in a complete bezel mold having a bezel injection half and a bezel ejection half to form a bezel, injecting a second material in a complete optics mold to form a lens, whereas the lens is co-molded to the bezel, and injecting a third material in a complete gasket mold to form a gasket, whereas the gasket is co-molded to the bezel.

The invention also relates to a co-molded lens assembly comprising a bezel, a lens co-molded to the bezel, and a gasket co-molded to the bezel.

The invention further relates to a method of manufacturing an over-molded lens assembly, comprising injection molding a first part in a first injection mold, transferring the first part to a second injection mold, injection molding a second part in the second injection mold, the second part being over-molded to the first part.

BRIEF DESCRIPTION OF THE DRAWINGS

FIG. 1A is a perspective view of a typical LED fixture showing a lens and a bezel.

FIG. 1B is a section view of the LED fixture of FIG. 1A.

FIG. 2A is a drawings showing a bezel, a lens, and a gasket, each separately molded.

FIG. 7C is a section view of a mold used to produce a co-molded lens and bezel of the invention.

FIG. 7D is a section view of a mold used to produce a co-molded lens, bezel, and gasket of the invention.

DETAILED DESCRIPTION OF THE INVENTION

Figure 2B:
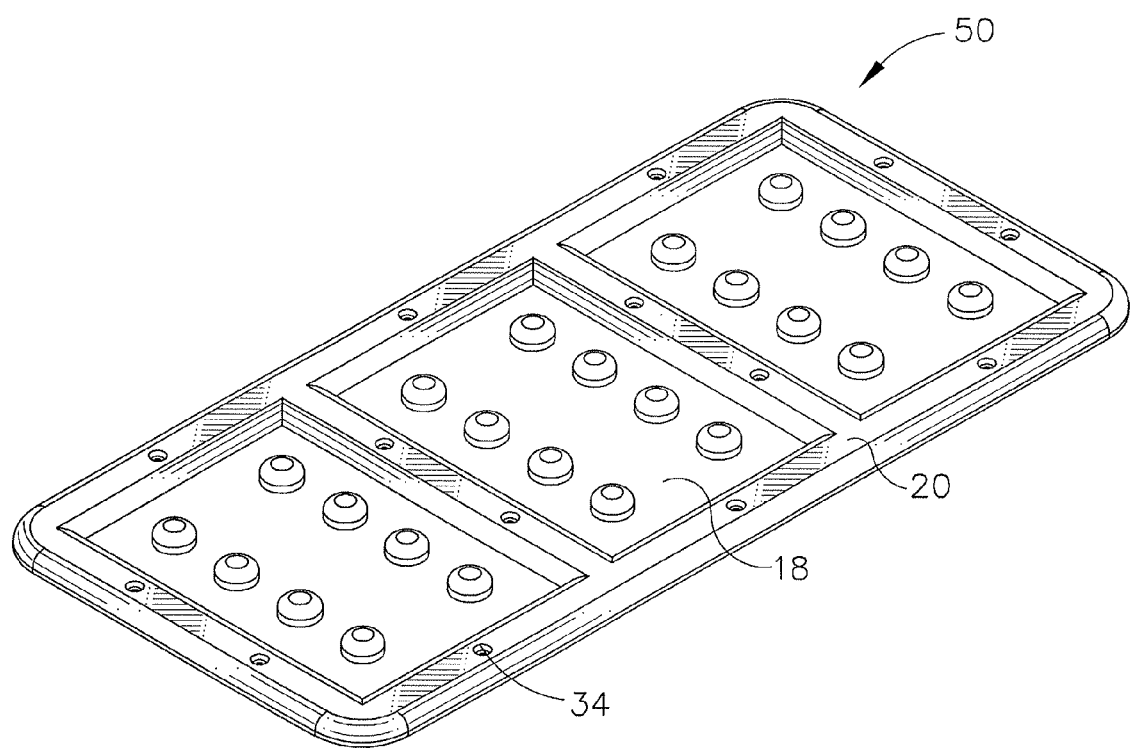
FIG. 2B shows an assembled bezel, lens and gasket.

FIGS. 1A and 1B show a typical LED fixture 10 having a housing 12, a support 14, a LED light board 16, a lens 18 and a bezel 20. The LED light board 16, having LEDs 24, is affixed to the housing 12 with brackets 22. The bezel 20 holds the lens 18 and is affixed to the housing 12 with fasteners 26. A gasket 28 is disposed between the bezel 20 and the housing 12 to seal the inside 30 of the housing 12 having the LED light board 16 from excessive contamination, such as moisture and dust. The lens 18, bezel 20, and gasket 28 form a light assembly 32.

FIGS. 2A and 2B show the typical components of a traditional lens assembly 50, including the bezel 20, the lens 18 and the gasket 28. Fastener holes 34 are provided for receiving fasteners used to fasten the lens assembly to the fixture housing. The bezel may be made from metal, hard plastic, or any other material of sufficient rigidity to secure the lens to the housing. Metal bezels are typically stamped from sheet metal in a die, and plastic bezels are typically injection molded. When plastic, the bezel is typically made from acrylic, polycarbonate, or other suitable polymer or thermoplastic. Typically, the lenses are acrylic or polycarbonate plastic, silicone rubber, polyester, or other optically clear material, and if plastic, are typically injection molded. The gasket can be made from a silicone or other gasket type material and is injection molded. The bezel has fastener holes for receiving fasteners, such as screws, for securing the bezel to the housing.

LED optics, or lenses, direct the light produced by the LED light source to the area where the light is needed and away from areas where it is not needed or would cause light trespass. For example, optics can be designed to create a very intense, but small light pattern, to create a broad and diffused light pattern, to truncate the light to prevent light trespass, or to achieve any combinations of the those objectives. Light trespass occurs when light spills into areas where it is not wanted. For example, commercial developments in residential areas often design outdoor lighting systems to prevent light from spilling, or trespassing, onto neighboring residential properties.

Because the bezel, lens, and gasket are traditionally made from three pieces, preassembly is required prior to securing the assembly to the fixture housing. Depending on the manufacturer, the gasket can be placed over the bezel, on top of the lens, under the lens, or around the lens extending above and below the lens. In one subassembly method, the lens or lenses are placed in the bezel and the gasket is set on top of the bezel. Then, the subassembly of the lens, bezel and gasket is placed on the fixture housing and secured to the fixture housing with fasteners. While the steps in the process may proceed differently depending on the type of fixture being assembled, each case typically requires the bezel, lens, and gasket to be handled separately before installing the lens assembly on the fixture.

Figure 3:
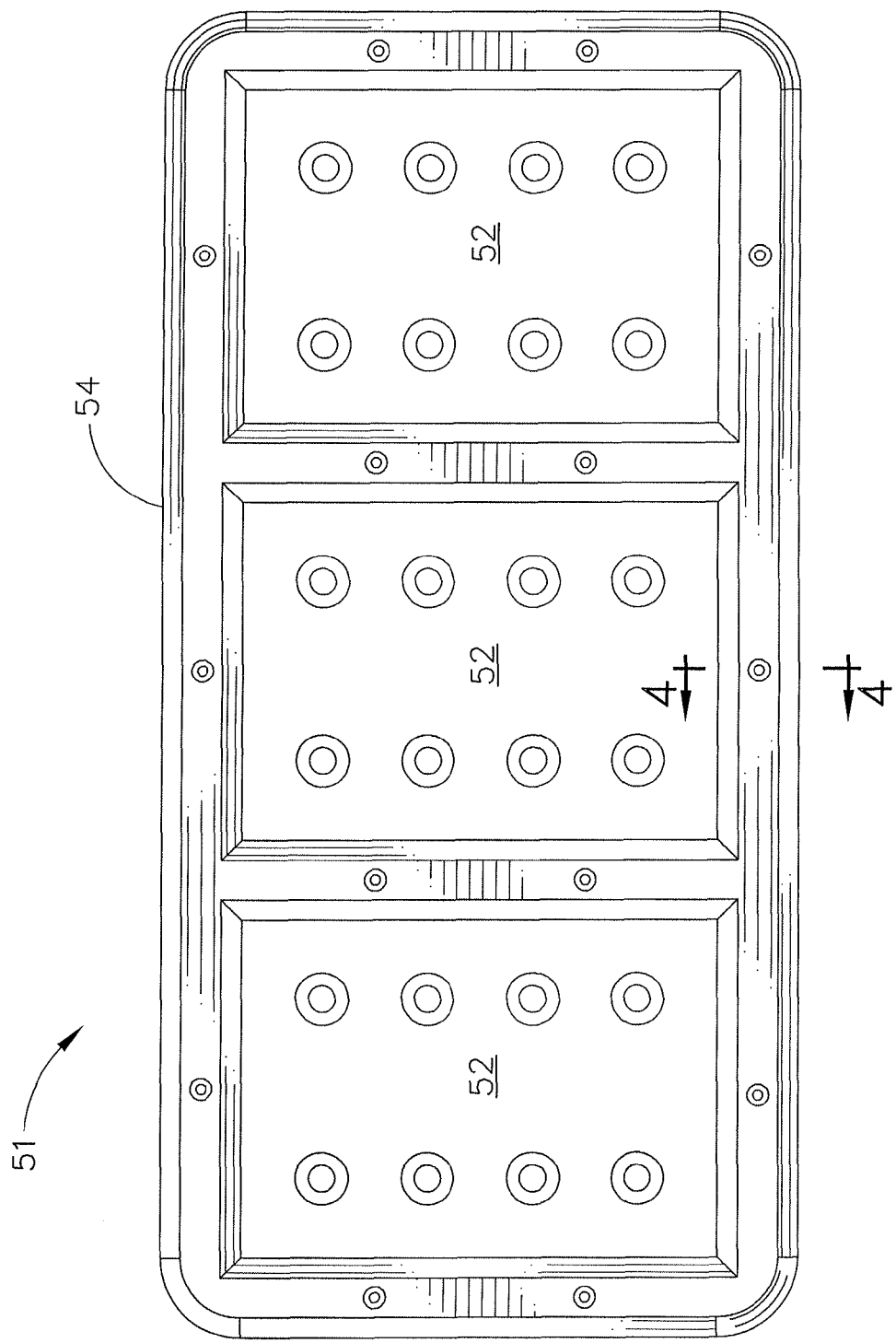
FIG. 3 is a top view of a co-molded lens assembly of the invention having a bezel, lens, and gasket.
Figure 4:
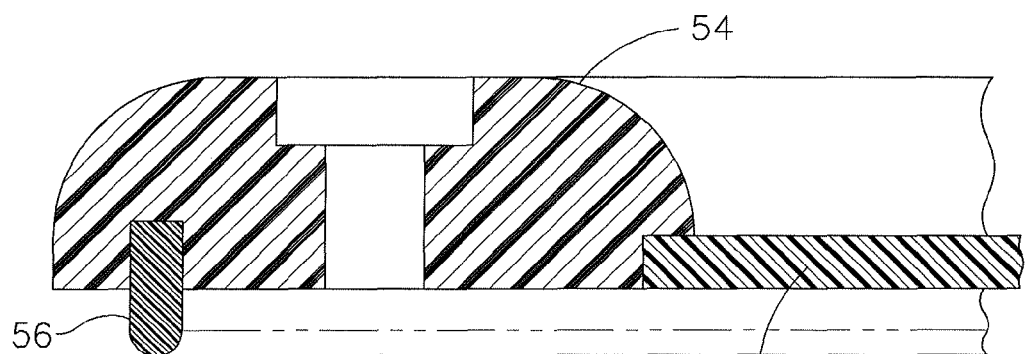
FIG. 4 is a partial section view of the co-molded lens assembly of FIG. 3 showing the bezel, lens, and gasket.
Figure 5:
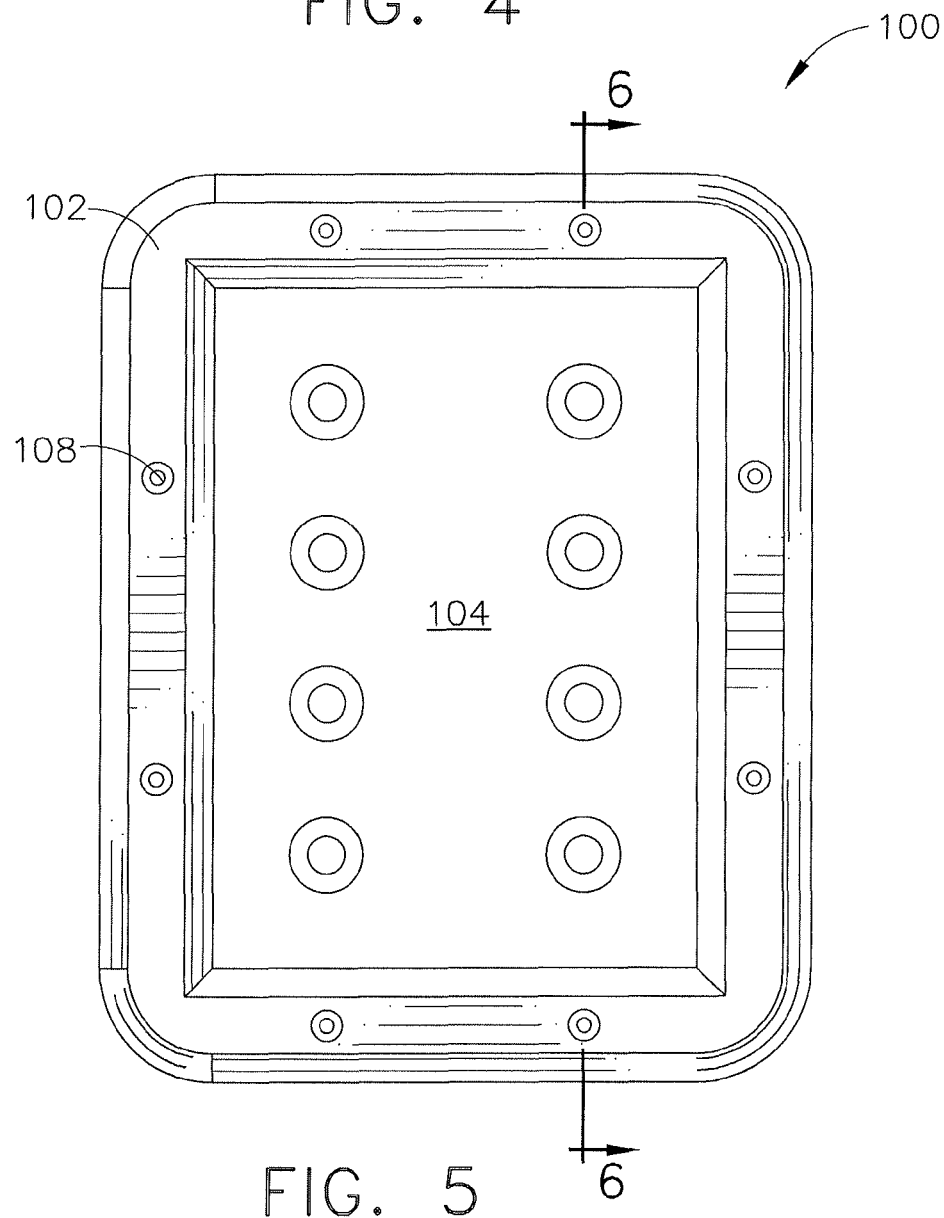
FIG. 5 is a top view of another co-molded lens assembly of the invention having a bezel, lens, and gasket.
Figure 6:
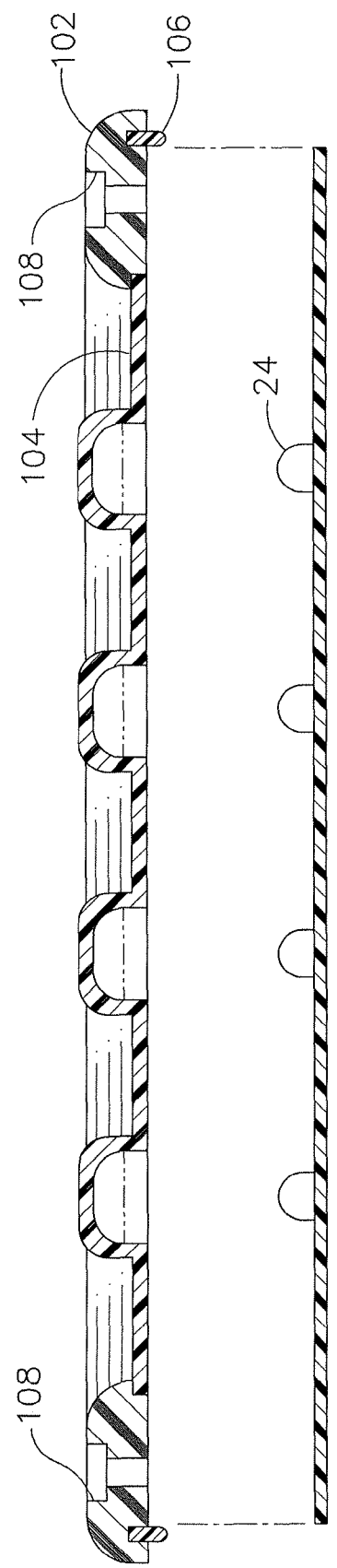
FIG. 6 is a section view of the co-molded lens assembly of FIG. 5 showing the bezel, lens, and gasket and an LED board.

FIGS. 3 and 4 show a co-molded lens assembly 51 having lenses 52, bezel 54, and gasket 56. The co-molded assembly is made in a multi-step injection molding process during which three types material, one for the lenses, one for the bezel, and one for the gasket, are injection molded to form a complete unitary assembly that requires no or limited preassembly prior to securing it to the housing. FIGS. 5 and 6 show a co-molded lens assembly 100 having a bezel 102, a lens 104, a gasket 106, and a fastener receiver 108. The co-molded lens assembly 100 may be molded in a multi-step injection molding process, as described below.

Figure 7A:
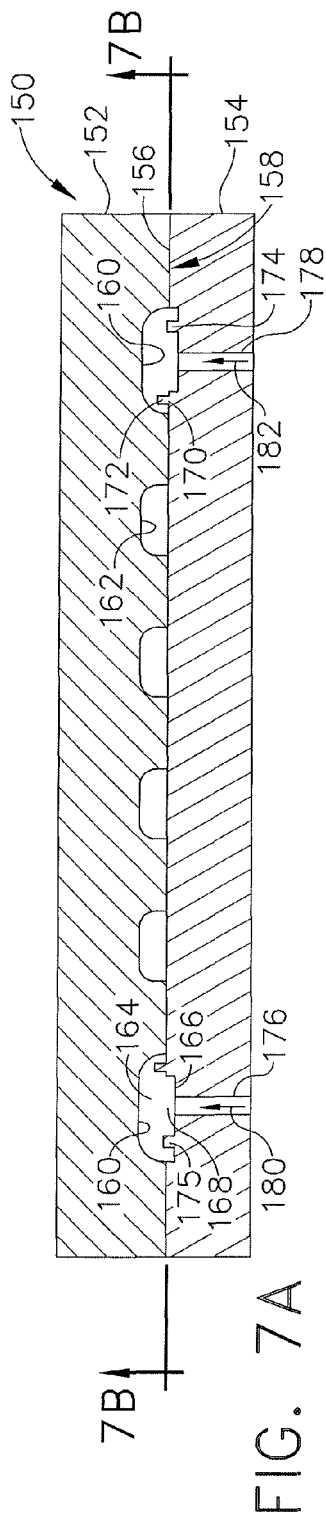
FIG. 7A is a section view of an injection mold used to produce a bezel of the invention.
Figure 7B:
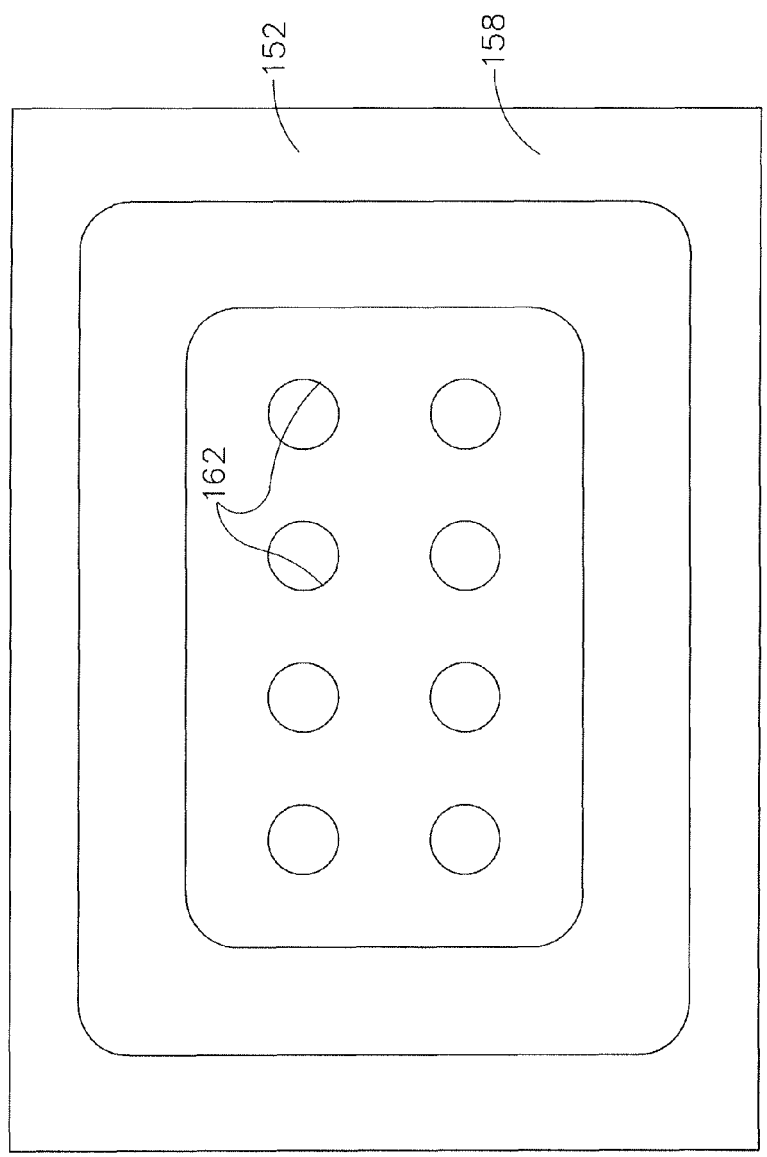
FIG. 7B is a top inside view of an ejection half of the injection mold of FIG. 7A.

FIGS. 7A and 7B show a complete bezel mold 150 that may be used in a first step of the injection molding process to injection mold the bezel. The complete bezel mold 150 is made of a bezel ejection half 152 and a bezel injection half 154. A line 156 shows the dividing line between the two halves. FIG. 7B shows an inside face 158 of the ejection half 152 of the bezel mold. The ejection half of the bezel mold defines a cavity 160 for receiving plastic for casting the upper portion 164 of the bezel. The ejection half 152 also defines cavities 162 that will be used subsequently for casting the optics or lens. The ejection half 152 and injection half 154 made at dividing line 156. Typically, the halves are held together by hydraulic rams.

The injection half 154 of the bezel mold 150 casts the lower portion 166 of the bezel. The injection half of the bezel mold includes a lower cavity 168 for casting the lower portion of the bezel. A relief area 170 for receiving the lens, to be injected later, may also be included. The relief area may include at least one pin 172, a rib, or other apparatus for creating a cavity beyond the relief area to anchor the lens to the bezel. The injection half also has ribs 174, 175 for creating a relief that will receive the injected gasket material. Different apparatus other than ribs 174, 175, such as pins or other void creating structures, may be used to create the cavity for the gasket material. Sprues 176 and 178 channel melted plastic to the bezel cavities 160 and 168. Here, the sprues feed directly into the bezel cavities. If multiple bezels are molded at the same time, then the mold may also include runners and gates to channel the melted plastic to the multiple bezel cavities. More or less sprues may be provided, depending on the size and complexity of the bezel being molded.

In operation, a first material for creating the bezel, typically a thermoplastic, polymer, acrylic, polycarbonate, or silicone, and here referred to as "plastic", is melted and injected into sprues 176 and 178 in the direction of arrows 180 and 182. The plastic flows into the bezel cavities 160 and 168 to create the bezel. Because the cavity for the optics 162 is not connected to the cavity for the bezel 160 or the sprues 172 and 178, the plastic being injected for the bezel does not flow into the cavity for the optics. After the bezel cools sufficiently, which may occur by water cooling the ejection and injection halves 152 and 154 of the mold, the hydraulic pressure holding the mold together is released and the ejection half 152 is separated from the injection half 154. After being separated, the injected bezel remains in the ejection half 152, and the ejection half 152 with the injected bezel is transferred to an optics injection half 181, as shown in FIG. 7C.

FIG. 7C shows a complete optics mold having the bezel ejection half 152 of the complete bezel mold 150 holding an injected bezel 183 mated with the optics injection half 181. The optics injection half 181 defines a cavity 184 for receiving a second material, typically an acrylic, polycarbonate, polyester, silicone, or other optically transparent material and here referred to as "optics plastic" from sprues 186 and 188. As the melted optics plastic flows through sprues 186 and 188 in the direction of arrows 190 and 192, respectively, it flows into the cavity 184 in the optics injection half 181 and into the cavity 162 in the ejection half. The optics plastic flows in the direction of arrows 194, 196, 198, and 292 to fill the cavities 184 and 162. The optics plastic flows into the reliefs 204 and 206 left by the at least one pin 172 from the injection half of the mold 154 when the bezel was injected. The optics plastic in the reliefs 204 and 206 locks a completed lens 208 into the bezel.

After the completed lens 204 cools sufficiently, which may occur by water cooling the bezel ejection half 152 and optics injection half 181 of the mold, the hydraulic pressure holding the mold together is released and the ejection half 152 is separated from the optics injection half 181. After being separated, the injected bezel 183 and completed lens 208 remains in the ejection half 152, and the ejection half 152 with the injected bezel is transferred to a gasket injection half 210, as shown in FIG. 7D.

FIG. 7D shows a complete gasket mold having the bezel ejection half 152 holding a completed bezel 183 and lens 208 mated with the gasket injection half 210. The gasket injection half 210 defines cavities 212 and 214 for receiving a third material, typically a silicone, thermoplastic elastomer or other type of sealing material and here referred to as "gasket material" through sprues 216 and 218 for molding the gasket. The bezel 183 has cavities 220, 222 formed by ribs 174, 175 to receive melted gasket material. When injected, the melted gasket material flows through sprues 216 and 218 in the direction of arrows 224 and 226, respectively, and into the cavities 212, 214, 220, and 222 to form the gasket.

After the completed gasket 228 cools sufficiently, which may occur by water cooling the ejection half 152 and gasket injection half 210 of the mold, the hydraulic pressure holding the mold together is released and the ejection half 152 is separated from the gasket injection half 210. After being separated, the injected bezel 183, completed lens 208, and completed gasket 228 remain in the ejection half 152, and a complete lens assemble is ejected. While this embodiment describes the parts being injected in the order of bezel, optics, gasket, the parts may be injected in any technically feasible order.

After the completed lens assembly is ejected, typically cleanup work consisting of removing extra material such as flashing and material left in the sprues is required.

In the previously described embodiment, the bezel ejection half 152 of the mold is used for molding the bezel, the lens, and the gasket and only the injection half of the mold is changed for each step. In a second embodiment, a robot is used to move completed subpieces from one mold to another, and a separate ejection half and injection half mold are used for each of the bezel, lens, and gasket molding operations. Typically, a complete bezel mold has a bezel injection half and a bezel ejection half, a complete optics mold has an optics injection half and an optics ejection half, and a complete gasket mold has a gasket injection half and a gasket ejection half. A robot is used to transfer each completed subassembly, the bezel after the first injection process and the bezel and lens assembly after the second injection process, to the next mold. For example, after the bezel is made, a robot removes the bezel from the complete bezel mold having the bezel ejection half and the bezel injection half and transfers it to the complete optics mold having the optics ejection half and the optics injection half. The complete optics mold is used to mold the lens is sized to receive the completed bezel and has cavities for receiving the optics plastic. After the bezel is transferred to the complete optics mold, the mold is closed and the optics plastic is injected. After cooling, the bezel and lens assembly is removed from the complete optics mold and transferred to the complete gasket mold having the gasket injection half and the gasket ejection half, which is sized to receive the bezel and lens assembly and is used to mold the gasket. After molding the gasket, the completed lens assembly is ejected from the complete gasket mold. Each of the injection halves and ejection halves are similar to those shown in FIGS. 7A, 7C, 7D, and 8. While this embodiment describes the order of injection as bezel, lens, gasket, the process could be performed in a variety of orders, including: bezel, lens, gasket; bezel, gasket, lens; gasket, bezel, lens; gasket, lens, bezel; lens, bezel, gasket; and lens, gasket, bezel.

In another embodiment, one part of the lens assembly could be molded at one location and shipped to another final molding location, where the remaining parts are molded. The process of molding a part over a complete part is typically referred to as over-molding. For example, one manufacture may have expertise in molding lenses and another in molding bezels and gaskets. The lens manufacturer may mold the lens in a complete optics mold and then ship the lens to an injection molder who will over-mold the bezel to the lens in a complete bezel mold and the gasket to the lens and bezel in a complete gasket mold. The bezel and gasket manufacturer will place the molded lens into the complete bezel mold that is sized to receive the lens and has voids for receiving the melted bezel plastic to mold the bezel. The lens can be placed in the complete bezel mold manually or automatically, such as with a robot. The bezel is then injection molded, or over-molded, around the lens, the bezel and lens assembly is moved to a complete gasket mold, either by transferring it with the ejection mold half to a gasket injection half as described above or by removing the molded assembly and transferring it to another the complete gasket mold. In this described embodiment, the lens is a first part, the bezel is a second part, and the gasket is a third part. Depending on the order selected, the lens, bezel, or gasket each could be the first, second, or third part.

Figure 8:
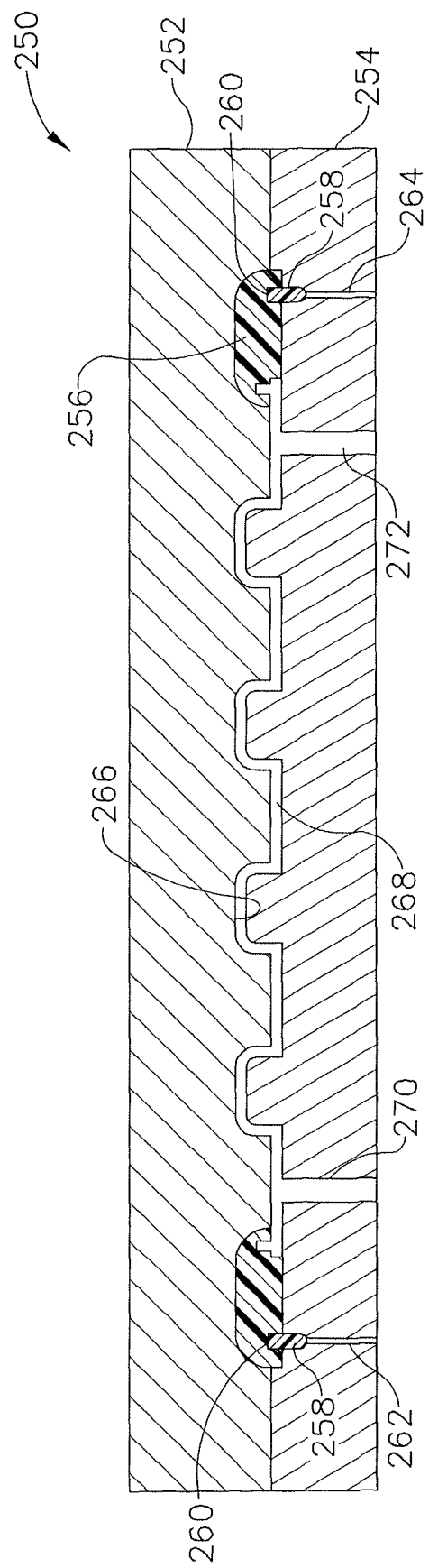
FIG. 8 is a section view of a mold of the invention, in which the injection half is used to co-mold a lens and a gasket to a bezel.

In another embodiment, two, or all three of the parts (the bezel and the lens, the bezel and the gasket, the lens and the gasket, or the bezel, lens, and gasket), are molded in a single mold. Shown in FIG. 8 is a mold 250 with an ejection half 252 and an injection half 254. A completed bezel 256, molded in a previous step, is shown disposed in the mold. A cavity 258 in the injection half 254 mates with a cavity 260 in the bezel to provide a receiving area for melted gasket material to be injected through sprues 262 and 264. At least one cavity 266 in the ejection half 252 mates with a cavity 268 in the injection half 254 form a receiving area for melted lens material to be injected through sprues 270 and 272. In this embodiment, the lens and the gasket can be injected at the same time using the same mold.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention is therefore not limited to the specific details, representative apparatus and method, and illustrated examples shown and described. Accordingly, departures may be made from such details without departing from the scope or spirit of the invention.

The invention claimed is:

1. A method of manufacturing a co-molded lens assembly comprising
   a. injecting a first material in a complete bezel mold having a bezel injection half and a bezel ejection half to form a bezel;
   b. injecting a second material in a complete optics mold to form a lens, whereas the lens is co-molded to the bezel; and
   c. injecting a third material in a complete gasket mold to form a gasket, whereas the gasket is co-molded to the bezel.

2. The method according to claim 1, whereas the first material is selected from the group consisting of a thermoplastic and a polymer.

3. The method according to claim 1, whereas the first material is selected from the group consisting of acrylic, polycarbonate, and silicone.

4. The method according to claim 1, whereas the second material is selected from the group consisting of acrylic, polycarbonate, polyester, and silicone.

5. The method according to claim 1, whereas the third material is selected from the group consisting of a silicone and a thermoplastic elastomer.

6. The method according to claim 1, and further comprising the step of retaining the molded bezel in the bezel ejection mold, and transferring and mating the bezel ejection mold having the formed bezel to an optics injection half to form a complete optics mold.

7. The method according to claim 1, and further comprising the step of retaining the co-molded bezel and lens in the bezel ejection mold, and transferring and mating the bezel ejection mold having the formed bezel and lens to a gasket injection half to form a complete gasket mold.

8. The method according to claim 1, further comprising transferring the bezel from the complete bezel mold to a complete lens mold having an optics injection half and an optics ejection half, wherein the step of injecting a second material to mold a lens is performed in the complete optics mold.

9. The method according to claim 8, wherein the transferring the bezel step comprises transferring with a robot.

10. The method according to claim 8, further comprising transferring the lens and bezel from the complete optics mold to a complete gasket mold having a gasket injection half and a gasket ejection half, wherein the step of injecting a third material to mold the gasket is performed in the complete gasket mold.

11. The method according to claim 10, wherein the transferring the lens and bezel step comprises transferring with a robot.

12. A co-molded lens assembly comprising
    a. a bezel,
    b. a lens co-molded to the bezel, and
    c. a gasket co-molded to the bezel.

* * * * *